US012330752B2

(12) United States Patent
Miller et al.

(10) Patent No.: US 12,330,752 B2
(45) Date of Patent: Jun. 17, 2025

(54) HELICAL ANCHOR GROUP INSTALLATION SYSTEM

(71) Applicant: TRITON SYSTEMS, INC., Chelmsford, MA (US)

(72) Inventors: Zachary Miller, Merrimack, NH (US); Rafael Mandujano, Arlington, MA (US); Aaron Bradshaw, East Greenwich, RI (US); Tyler Robertson, Chelmsford, MA (US); Tyson Lawrence, Chelmsford, MA (US)

(73) Assignee: TRITON SYSTEMS, INC., Chelmsford, MA (US)

( * ) Notice: Subject to any disclaimer, the term of this patent is extended or adjusted under 35 U.S.C. 154(b) by 225 days.

(21) Appl. No.: 17/101,978

(22) Filed: Nov. 23, 2020

(65) Prior Publication Data

US 2021/0155322 A1    May 27, 2021

Related U.S. Application Data

(60) Provisional application No. 62/939,239, filed on Nov. 22, 2019.

(51) Int. Cl.
*B63B 21/50* (2006.01)
*B63B 35/44* (2006.01)
*F03D 13/25* (2016.01)

(52) U.S. Cl.
CPC .............. *B63B 21/50* (2013.01); *B63B 35/44* (2013.01); *F03D 13/25* (2016.05); *B63B 2035/446* (2013.01)

(58) Field of Classification Search
CPC .... B63B 21/50; B63B 35/44; B63B 2035/446
See application file for complete search history.

(56) References Cited

U.S. PATENT DOCUMENTS

| 5,244,312 A | 9/1993 | Wybro et al. |
| 6,665,990 B1 * | 12/2003 | Cody ...................... E02D 27/42 |
| | | 405/252.1 |

(Continued)

FOREIGN PATENT DOCUMENTS

| CA | 2872298 A1 * | 6/2015 | ............. E02D 5/801 |
| CN | 101705920 A * | 5/2010 | ....... E02B 2017/009 |

(Continued)

OTHER PUBLICATIONS

Extended European Search Report for Application No. 20900513.1, dated Nov. 24, 2023, 7 pages.

(Continued)

*Primary Examiner* — S. Joseph Morano
*Assistant Examiner* — Jovon E Hayes
(74) *Attorney, Agent, or Firm* — Caldwell Intellectual Property Law

(57) ABSTRACT

Disclosed herein is an offshore anchor system comprising two or more helical anchors, each having a predetermined length; and a template acting as a base connecting the two or more helical anchors. Some embodiments further comprise a skirt protruding from the periphery of the template in a direction substantially parallel to the length of the two or more helical anchors thereby providing additional lateral support.

14 Claims, 2 Drawing Sheets

(56) References Cited

U.S. PATENT DOCUMENTS

| | | | |
|---|---|---|---|
| 8,729,723 B2 * | 5/2014 | Boureau | F03D 80/85 |
| | | | 290/55 |
| 8,845,236 B1 * | 9/2014 | Dosdourian | E02D 5/801 |
| | | | 405/253 |
| 10,100,482 B2 | 10/2018 | Larsen et al. | |
| 2003/0190195 A1 | 10/2003 | Cuthill et al. | |
| 2005/0229836 A1 * | 10/2005 | Borgen | E02D 27/42 |
| | | | 114/264 |
| 2010/0135729 A1 * | 6/2010 | Finnigan | B63B 21/26 |
| | | | 405/224 |
| 2010/0166503 A1 | 7/2010 | Will | |
| 2011/0074155 A1 * | 3/2011 | Scholte-Wassink | B63B 35/44 |
| | | | 290/55 |
| 2012/0213597 A1 * | 8/2012 | Baumsteiger | E02D 5/801 |
| | | | 405/252.1 |
| 2014/0161538 A1 | 6/2014 | Meggitt et al. | |
| 2015/0275461 A1 | 10/2015 | Kwon et al. | |
| 2016/0348332 A1 | 12/2016 | Talbert et al. | |
| 2017/0174294 A1 * | 6/2017 | Meltsov | B63B 39/10 |
| 2019/0271131 A1 * | 9/2019 | Perko | E02D 5/56 |
| 2021/0048055 A1 * | 2/2021 | Brown | E02D 5/801 |
| 2023/0203774 A1 | 6/2023 | Huisman et al. | |

FOREIGN PATENT DOCUMENTS

| | | | | | |
|---|---|---|---|---|---|
| CN | 104294838 A | | 1/2015 | | |
| CN | 110453716 A | | 11/2019 | | |
| KR | 100719300 B1 | | 5/2007 | | |
| KR | 20130085354 A | | 7/2013 | | |
| KR | 20150021226 A | * | 3/2015 | | B63B 21/10 |
| KR | 20220160411 A | * | 12/2022 | | E02D 5/56 |
| LU | 501903 B1 | | 10/2022 | | |
| WO | 2007019609 A1 | | 2/2007 | | |
| WO | 2013140421 A1 | | 9/2013 | | |
| WO | WO-2013150276 A1 | * | 10/2013 | | B63B 21/00 |
| WO | 2021118798 A2 | | 6/2021 | | |
| WO | 2022261503 A1 | | 12/2022 | | |

OTHER PUBLICATIONS

International Preliminary Report on Patentability for PCT/US2020/061834 dated Jun. 2, 2022, 7 Pages.

International Search Report and Written Opinion for PCT/US2022/033111 dated Nov. 3, 2022, 13 pages.

International Search Report and Written Opinion for PCT/US2020061834 mailed Jun. 22, 2021.

* cited by examiner

HELICAL ANCHOR GROUP INSTALLATION SYSTEM

CROSS REFERENCE TO RELATED APPLICATIONS

This application claims the benefit of U.S. Provisional Patent Application Ser. No. 62/939,239, filed Nov. 22, 2019, entitled Helical Anchor Group Installation System, the entire disclosure of which is hereby incorporated by reference in its entirety.

GOVERNMENTAL RIGHTS

This invention was made with government support under contract number DE-SC0017969, project number 2576, awarded by the Department of Energy. The government has certain rights in the invention.

SUMMARY

Disclosed herein is an offshore anchor system comprising two or more helical anchors, each having a predetermined length; and a template acting as a base connecting the two or more helical anchors.

Some embodiments further comprising a skirt protruding from the periphery of the template in a direction substantially parallel to the length of the two or more helical anchors thereby providing additional lateral support.

In some embodiments, the skirt protrudes from the template in the same direction as the two or more helical anchors, wherein the skirt protrudes about 5% to about 50% of the length of the two or more helical anchors.

In some embodiments, the template and the skirt are separate items that can be assembled on site.

In some embodiments, the offshore anchor system comprising two or more helical anchors, each having a predetermined length; a template acting as a base connecting the two or more helical anchors, and a skirt protruding from the periphery of the template in a direction substantially parallel to the length of the two or more helical anchors and for a distance of about 5% to about 50% of the length of the helical anchor thereby providing additional lateral support.

Some embodiments provide a method of anchoring an offshore floating platform comprising anchoring such anchor systems to the seafloor and mooring a floating platform thereto.

These and other aspects will be apparent from this disclosure.

Figure 1:
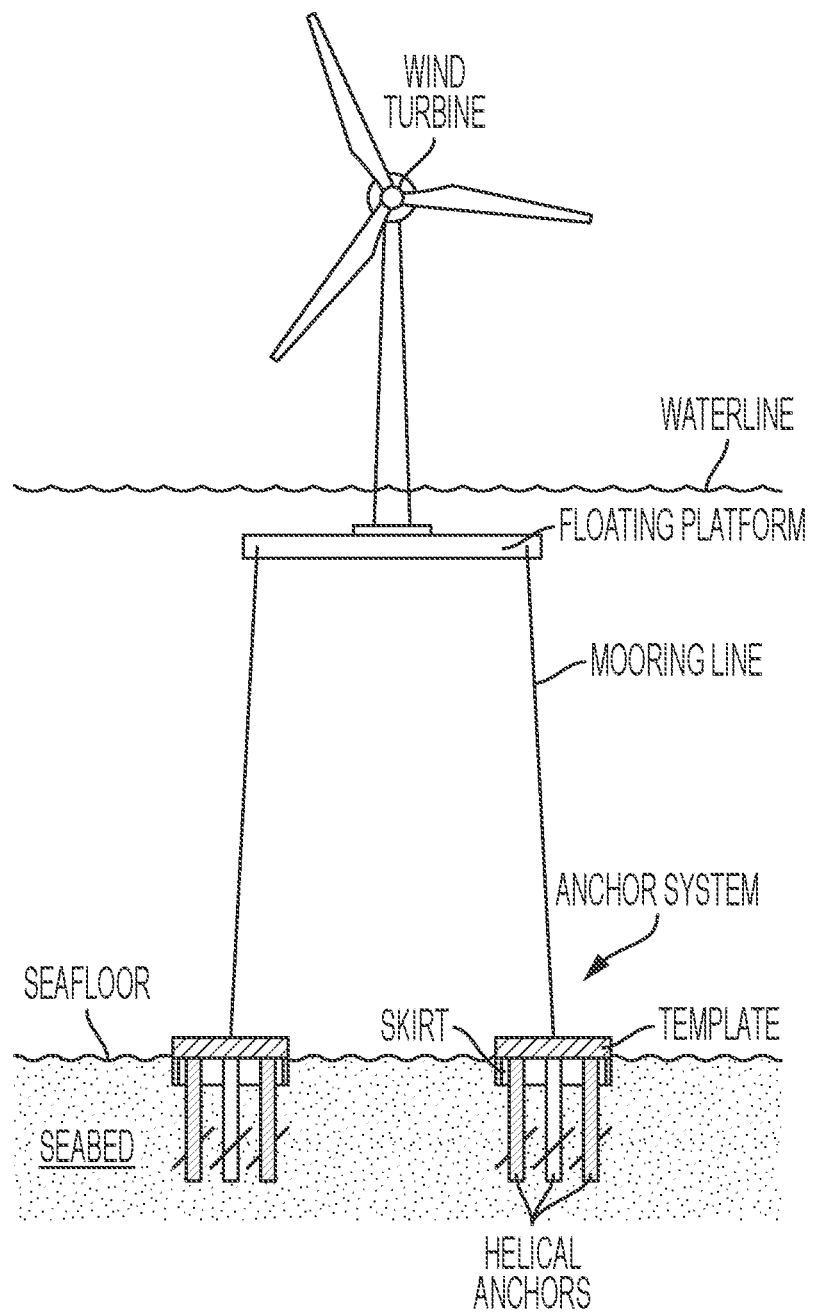
FIG. 1 is a schematic depiction of a wind turbine and anchoring system in accordance with an embodiment described herein.

The drawings are illustrative only and are not necessarily to scale.

DETAILED DESCRIPTION

The popularity of offshore wind farms is increasing, as is its practicality. Key to the success of such offshore wind farms is safely anchoring the turbines. The current anchoring solutions are massive in size for the growing increase in turbines which creates installation issues, transportation complications, and extensive manufacturing. The invention provides a solution that is easily manufactured, shippable and provides a straightforward installation in a lower overall cost to the offshore floating wind farms. The proposed anchoring solutions benefit from one or more of low cost, ease of manufacture, low noise, ease of shipping, simpler installation, etc.

Instead of massive anchoring solutions, the proposed system employs multiple small easily manufactured helical anchors in close proximity combined with template and an optional skirt. Such a combination is not used in the offshore floating wind sector.

The systems disclosed herein use multiple small helical anchors, a template, and an optional skirt to provide the uplift and lateral capacities required to moor a floating wind platform. The invention is made up of three components to provide the capacities needed for the offshore wind sector; helical anchors, a template, and an optional skirt. The anchor system will be installed by a subsea remote tool. The helical anchors provide the majority of the uplift capacity for the system. Helical anchors are installed by applying torque and crowd (down force) and screwing them into the seabed. Based on the site-specific soil conditions, the helical anchors style, size and length will be determined for the optimal performance. The template is a base platform that holds all the helical anchors together and provides a mooring connection for the floating platform or to which the rigid components are connected. The template also provides the base for the subsea tool to sit on while each anchor is installed. The template will provide some uplift and lateral capacities but compared to the overall system will have relatively small benefits. The main purpose of the template is to provide stability and load transfer from anchor to anchor from the mooring connection point. The skirt will provide increased lateral capacity for the system.

Each helical anchor comprises of a shaft, and a helical plate. Shaft lengths may range from approximately 5-20 feet and may be connected by couplers. The helical plate is designed and positioned such that twisting the anchor forces the shaft downward into the seabed. Multiple anchors maybe employed in a single anchor system held together via the template.

The template comprises a base portion that may be made of any suitable material, such as, but not limited to concrete and/or metal. The template engages and connects each of the multiple anchors together as a system. The template and anchors may be transported separately and assembled in place, making the system easy to transport, use, and install, as well as making it scalable depending on site needs.

The skirt comprises an exterior shell ranging in size and thickness attached to the circumference of the template, made of suitable material which includes but is not limited to metal, stone, or concrete.

FIG. 1 depicts a schematic view of a single wind turbine moored to the seafloor using an anchoring system as described herein. As shown, a wind turbine is affixed to a floating platform at or near the waterline. Any suitable turbine and floating device may be used. Various turbine (single or multiple) and floating devices (e.g. floating platform, Dutch tri-floater, barge, spar, mono-hull TLP, etc.) may be used in conjunction with the anchoring system described herein.

The floating platform is affixed to one or more anchoring systems via one or more mooring lines.

Each anchoring system comprises a plurality of helical anchors, each of which is embedded in the seabed and coupled to the template. A skirt is provided at the periphery of the template such that the skirt is also embedded in the seabed to provide additional lateral support. The depth of the skirt, as with the helical anchors themselves, is determined on a case by case basis in light of the site where they are installed, factors such as depth, seabed composition, currents, and more may come into consideration. In some embodiments, the skirt extends into the seabed up to 5% of the length of the anchor shaft, in some embodiments the skirt extends 10%, 15%, 20%, 25%, 30%, 40%, or up to 50% of the length of the anchor shaft.

Figure 2:
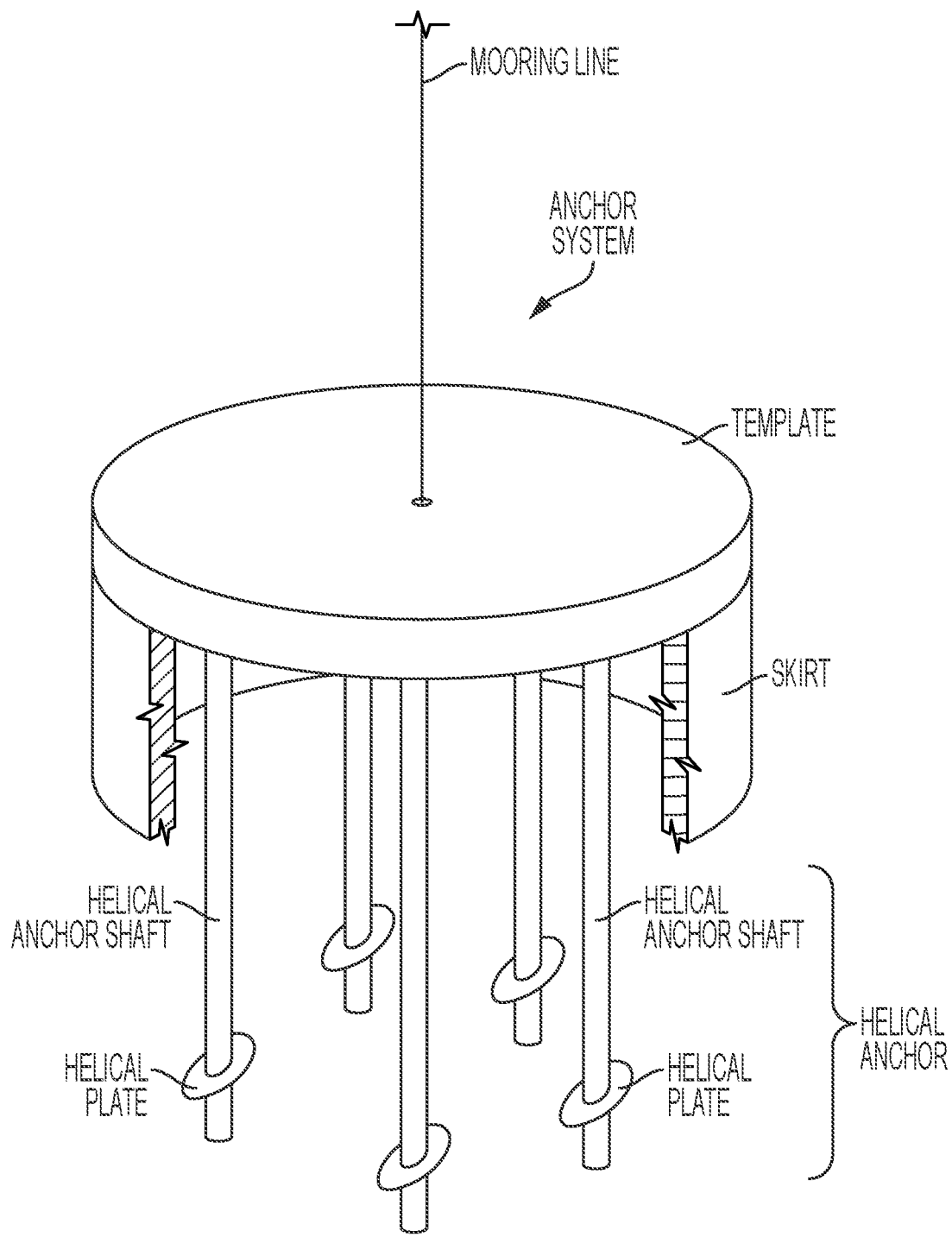
FIG. 2 is a partial cut-away view of an anchoring system as described herein.

As depicted in FIG. 2, the template is circular and the accompanying skirt is a hollow cylinder. Any shape may be used, including oval, square, rectangle, etc. for the template, with sidewalls extending therefrom to form the skirt in a complimentary shape.

As depicted, a single mooring attachment and mooring line is affixed to the template. In some embodiments, multiple mooring lines may be affixed to the template.

The combination of the plurality of helical anchors, the template and the optional skirt create a secure anchoring arrangement that is easy to manufacture, ship, and install.

In some embodiments, two or more anchoring systems are used to moor the same platform.

These and other embodiments will be apparent to those of skill in the art upon reading this specification, without deviating from the scope and spirit of this disclosure.

The cost of anchoring offshore floating wind turbines is an obstacle to reducing the cost of energy from offshore floating wind projects and presents an opportunity for savings. Deep water at sites on the West Coast further drives up these costs. Traditional anchoring systems use large heavy weights, casings, or high drag embedment forces to achieve high-pullout forces required for moorings. High weights and forces ultimately convert into high costs. Proposed herein is a robust anchoring system that can be installed with low forces and managed remotely from a generic offshore vessel. This approach is being adopted as a cost-saving measure for seafloor characterization surveys in deepwater and can provide similar cost savings for mooring installation costs. This anchoring technology is scalable and applicable to many types of subsea foundations beyond offshore wind, such as oil & gas, pipelines, and other renewable energy systems. Beyond the public benefit of lower cost green energy, the system minimizes acoustic impacts on the environment.

What is claimed is:

1. An offshore anchor system comprising:
    two or more helical anchors, each further comprising a shaft and a helical plate and each having a predetermined length; and
    a template, through which the shaft of each helical anchor passes, wherein the template acts as a base for aligning and connecting the two or more helical anchors and as a support for a deep water installation tool;
    wherein the offshore anchor system is adapted for installation and use in deep water.

2. The offshore anchor system of claim 1, further comprising:
    a skirt protruding from the periphery of the template in a direction substantially parallel to the length of the two or more helical anchors thereby providing additional lateral support.

3. The offshore anchor system of claim 2, wherein the skirt protrudes from the template in the same direction as the two or more helical anchors, wherein the skirt protrudes about 5% to about 50% of the length of the two or more helical anchors.

4. The offshore anchor system of claim 2, wherein the template and the skirt are separate items that can be assembled on site.

5. The offshore anchor system of claim 4, wherein the template and the skirt are a uniform construction.

6. The offshore anchor system of claim 1, wherein the template further comprises a metal template comprising an attachment point for each of the two or more helical anchors, such that each helical anchor can be permanently attached to the template.

7. The offshore anchor system of claim 1, wherein each helical anchor is substantially parallel with each other.

8. The offshore anchor system of claim 1, wherein at least one of the two or more helical anchors is not parallel to at least one other of the two or more helical anchors.

9. An offshore anchor system comprising:
    two or more helical anchors, each further comprising a shaft and a helical plate and each having a predetermined length;
    a template acting as a base connecting the two or more helical anchors,
    wherein the shaft of each helical anchor passes through the template and is secured thereto; and
    a skirt protruding from the periphery of the template in a direction substantially parallel to the length of the two or more helical anchors and for a distance of about 5% to about 50% of the length of the helical anchor thereby providing additional lateral support
    wherein the offshore anchor system is adapted for installation and use in deep water.

10. An offshore mooring system comprising two or more offshore anchor systems of claim 1.

11. A method of anchoring an offshore floating platform comprising:
    anchoring a template to the sea bed with one or more helical anchors passing through and securing the template; and
    mooring the floating platform to the template with a mooring line.

12. The method of claim 11, further providing a skirt extending from the periphery of the template into the sea bed.

13. The method of claim 12, wherein the skirt extends into sea bed about 5% to about 50% of the length of the helical anchor.

14. An offshore anchor system comprising:
    two or more helical anchors, each further comprising a shaft and a helical plate and each having a predetermined length; and
    a template that supports a subsea tool and acts as a base connecting the two or more helical anchors;
    a skirt protruding from the periphery of the template in a direction substantially parallel to the length of the two or more helical anchors thereby providing additional lateral support; wherein the skirt extends at least about 5% of the length of the two or more helical anchors and forms a hollow cavity capped by the template;
    wherein the shaft of each helical anchor passes through the template and is secured thereto
    wherein the offshore anchor system is adapted for installation and use in deep water.

* * * * *